United States Patent
Stahlhut et al.

(10) Patent No.: US 7,541,687 B2
(45) Date of Patent: Jun. 2, 2009

(54) METHOD AND SYSTEM FOR MANAGING AN ELECTRICAL OUTPUT OF A TURBOGENERATOR

(75) Inventors: Ronnie Dean Stahlhut, Bettendorf, IA (US); Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 94 days.

(21) Appl. No.: 11/521,242

(22) Filed: Sep. 13, 2006

(65) Prior Publication Data

US 2007/0210584 A1 Sep. 13, 2007

Related U.S. Application Data

(60) Provisional application No. 60/781,167, filed on Mar. 10, 2006.

(51) Int. Cl.
  *F01D 15/10* (2006.01)
  *F02C 6/00* (2006.01)
  *H02K 7/18* (2006.01)
  *H02P 9/04* (2006.01)
  *B60K 1/00* (2006.01)

(52) U.S. Cl. .................. 290/52; 290/40 C; 180/65.4
(58) Field of Classification Search ............. 290/40 C, 290/52; 180/65.4
See application file for complete search history.

(56) References Cited

U.S. PATENT DOCUMENTS

| | | | | |
|---|---|---|---|---|
| 4,211,930 A * | 7/1980 | Fengler | ................. | 290/15 |
| 4,414,805 A * | 11/1983 | Walker | ................. | 60/792 |
| 4,665,704 A | 5/1987 | Hartwig | ................. | 60/597 |
| 4,756,377 A * | 7/1988 | Kawamura et al. | ......... | 180/165 |
| 4,774,811 A * | 10/1988 | Kawamura | ................. | 60/608 |
| 4,798,257 A * | 1/1989 | Kawamura et al. | ......... | 180/165 |
| 4,805,409 A * | 2/1989 | Kobayashi | ................. | 60/597 |
| 4,886,978 A * | 12/1989 | Kawamura | ................. | 290/52 |
| 4,951,769 A * | 8/1990 | Kawamura | ................. | 180/65.4 |
| 4,955,199 A * | 9/1990 | Kawamura | ................. | 60/608 |
| 5,105,624 A * | 4/1992 | Kawamura | ................. | 60/608 |
| 5,172,784 A * | 12/1992 | Varela, Jr. | ................. | 180/65.4 |
| 5,343,970 A * | 9/1994 | Severinsky | ................. | 180/65.2 |
| 5,568,023 A * | 10/1996 | Grayer et al. | ................. | 318/139 |
| 5,698,905 A * | 12/1997 | Ruthlein et al. | ................. | 290/32 |
| 5,789,824 A * | 8/1998 | Selfors et al. | ................. | 290/52 |
| 5,806,617 A * | 9/1998 | Yamaguchi | ................. | 180/65.2 |
| 5,831,341 A * | 11/1998 | Selfors et al. | ................. | 290/52 |
| 5,848,659 A * | 12/1998 | Karg et al. | ................. | 180/65.4 |
| 5,893,423 A * | 4/1999 | Selfors et al. | ................. | 180/65.2 |
| 5,924,505 A * | 7/1999 | Theurillat et al. | ......... | 180/65.4 |
| 5,925,993 A * | 7/1999 | Lansberry | ................. | 318/139 |

(Continued)

FOREIGN PATENT DOCUMENTS

WO WO 02/50618 A2 6/2002

*Primary Examiner*—Quyen P Leung
*Assistant Examiner*—Pedro J Cuevas

(57) ABSTRACT

The system and method manages an electrical output of a turbogenerator in accordance with multiple modes. In a first mode, a direct current (DC) bus receives power from a turbogenerator output via a rectifier where turbogenerator revolutions per unit time (e.g., revolutions per minute (RPM)) or an electrical output level of a turbogenerator output meet or exceed a minimum threshold. In a second mode, if the turbogenerator revolutions per unit time or electrical output level of a turbogenerator output are less than the minimum threshold, the electric drive motor or a generator mechanically powered by the engine provides electrical energy to the direct current bus.

31 Claims, 7 Drawing Sheets

U.S. PATENT DOCUMENTS

| | | | |
|---|---|---|---|
| 5,965,991 A * | 10/1999 | Koike et al. | 318/139 |
| 5,969,624 A * | 10/1999 | Sakai et al. | 340/636.1 |
| 6,012,289 A | 1/2000 | Deckard et al. | 60/602 |
| 6,020,697 A * | 2/2000 | Shimasaki et al. | 318/140 |
| 6,053,842 A * | 4/2000 | Kitada et al. | 477/5 |
| 6,066,898 A * | 5/2000 | Jensen | 290/52 |
| 6,079,211 A * | 6/2000 | Woollenweber et al. | 60/612 |
| 6,097,164 A * | 8/2000 | DeRosa | 318/139 |
| 6,125,625 A * | 10/2000 | Lipinski et al. | 60/801 |
| 6,137,250 A * | 10/2000 | Hirano et al. | 318/376 |
| 6,169,332 B1 * | 1/2001 | Taylor et al. | 290/7 |
| 6,170,251 B1 * | 1/2001 | Skowronski et al. | 60/783 |
| 6,198,174 B1 * | 3/2001 | Nims et al. | 290/52 |
| 6,209,672 B1 * | 4/2001 | Severinsky | 180/65.2 |
| 6,213,234 B1 * | 4/2001 | Rosen et al. | 180/65.3 |
| 6,307,278 B1 * | 10/2001 | Nims et al. | 290/52 |
| 6,338,391 B1 * | 1/2002 | Severinsky et al. | 180/65.2 |
| 6,487,096 B1 * | 11/2002 | Gilbreth et al. | 363/35 |
| 6,554,088 B2 * | 4/2003 | Severinsky et al. | 180/65.2 |
| 6,612,386 B2 * | 9/2003 | Tamai et al. | 180/65.4 |
| 6,639,328 B2 * | 10/2003 | Wacknov | 290/52 |
| 6,683,389 B2 * | 1/2004 | Geis | 290/40 C |
| 6,757,597 B2 * | 6/2004 | Yakes et al. | 701/22 |
| 6,774,608 B2 * | 8/2004 | Hofstetter et al. | 322/24 |
| 6,787,933 B2 * | 9/2004 | Claude et al. | 290/52 |
| 6,812,586 B2 * | 11/2004 | Wacknov et al. | 290/52 |
| 6,958,550 B2 * | 10/2005 | Gilbreth et al. | 290/52 |
| 6,962,223 B2 * | 11/2005 | Berbari | 180/165 |
| 6,965,173 B2 * | 11/2005 | Fukasaku et al. | 290/40 C |
| 7,045,985 B2 * | 5/2006 | Huang et al. | 318/701 |
| 7,061,131 B2 * | 6/2006 | King et al. | 290/40 C |
| 7,104,347 B2 * | 9/2006 | Severinsky et al. | 180/65.2 |
| 7,148,649 B2 * | 12/2006 | Ganev | 318/701 |
| 7,237,634 B2 * | 7/2007 | Severinsky et al. | 180/65.2 |
| 7,283,923 B2 * | 10/2007 | Barila et al. | 702/142 |
| 7,336,000 B2 * | 2/2008 | Stahlhut et al. | 290/52 |
| 7,432,609 B2 * | 10/2008 | Obayashi et al. | 290/40 C |
| 7,471,008 B2 * | 12/2008 | Stahlhut et al. | 290/52 |
| 2002/0163819 A1 * | 11/2002 | Treece | 363/34 |
| 2002/0175522 A1 * | 11/2002 | Wacknov et al. | 290/52 |
| 2002/0190695 A1 * | 12/2002 | Wall et al. | 322/17 |
| 2002/0195821 A1 * | 12/2002 | Wacknov | 290/12 |
| 2003/0015873 A1 * | 1/2003 | Khalizadeh et al. | 290/7 |
| 2004/0080165 A1 * | 4/2004 | Geis et al. | 290/52 |
| 2004/0135436 A1 * | 7/2004 | Gilbreth et al. | 307/18 |
| 2005/0155349 A1 * | 7/2005 | Sugiura et al. | 60/605.1 |
| 2005/0179264 A1 * | 8/2005 | Ganev | 290/40 C |
| 2006/0066112 A1 * | 3/2006 | Geis et al. | 290/52 |
| 2007/0016385 A1 * | 1/2007 | Barila et al. | 702/142 |
| 2007/0210583 A1 * | 9/2007 | Stahlhut et al. | 290/52 |
| 2007/0246942 A1 * | 10/2007 | Stahlhut et al. | 290/40 A |

* cited by examiner

METHOD AND SYSTEM FOR MANAGING AN ELECTRICAL OUTPUT OF A TURBOGENERATOR

This document (including all drawings) claims priority based on U.S. provisional application Ser. No. 60/781,167, filed Mar. 10, 2006, under 35 U.S.C. 119(e).

This invention was made with U.S. government support under Cooperative Agreement No. DE-FC26-05NT42422 awarded by the Department of Energy (DOE). The U.S. government has certain rights in this invention.

FIELD OF THE INVENTION

The present invention relates to a method and system for managing an electrical output of a turbogenerator.

BACKGROUND OF THE INVENTION

A turbogenerator may comprise a turbine in communication with exhaust gas or steam associated with an internal combustion engine. The turbine is mechanically coupled to a primary generator or alternator that generates electrical energy that may be used by one or more components of the vehicle. The internal combustion engine may mechanically drive a secondary alternator or generator that generates electrical power. Accordingly, there is need to manage an output of both the primary generator and the secondary generator to use efficiently the generated power.

SUMMARY OF THE INVENTION

The system and method manages an electrical output of a turbogenerator in accordance with multiple modes. In a first mode, a direct current (DC) bus receives power from a turbogenerator output via a rectifier where turbogenerator revolutions per unit time (e.g., revolutions per minute (RPM)) or an electrical output level of a turbogenerator output meet or exceed a minimum threshold. In a second mode, if the turbogenerator revolutions per unit time or electrical output level of a turbogenerator output are less than the minimum threshold, the electric drive motor or a generator mechanically powered by the engine provides electrical energy to the direct current bus.

DESCRIPTION OF THE PREFERRED EMBODIMENT

Figure 1:
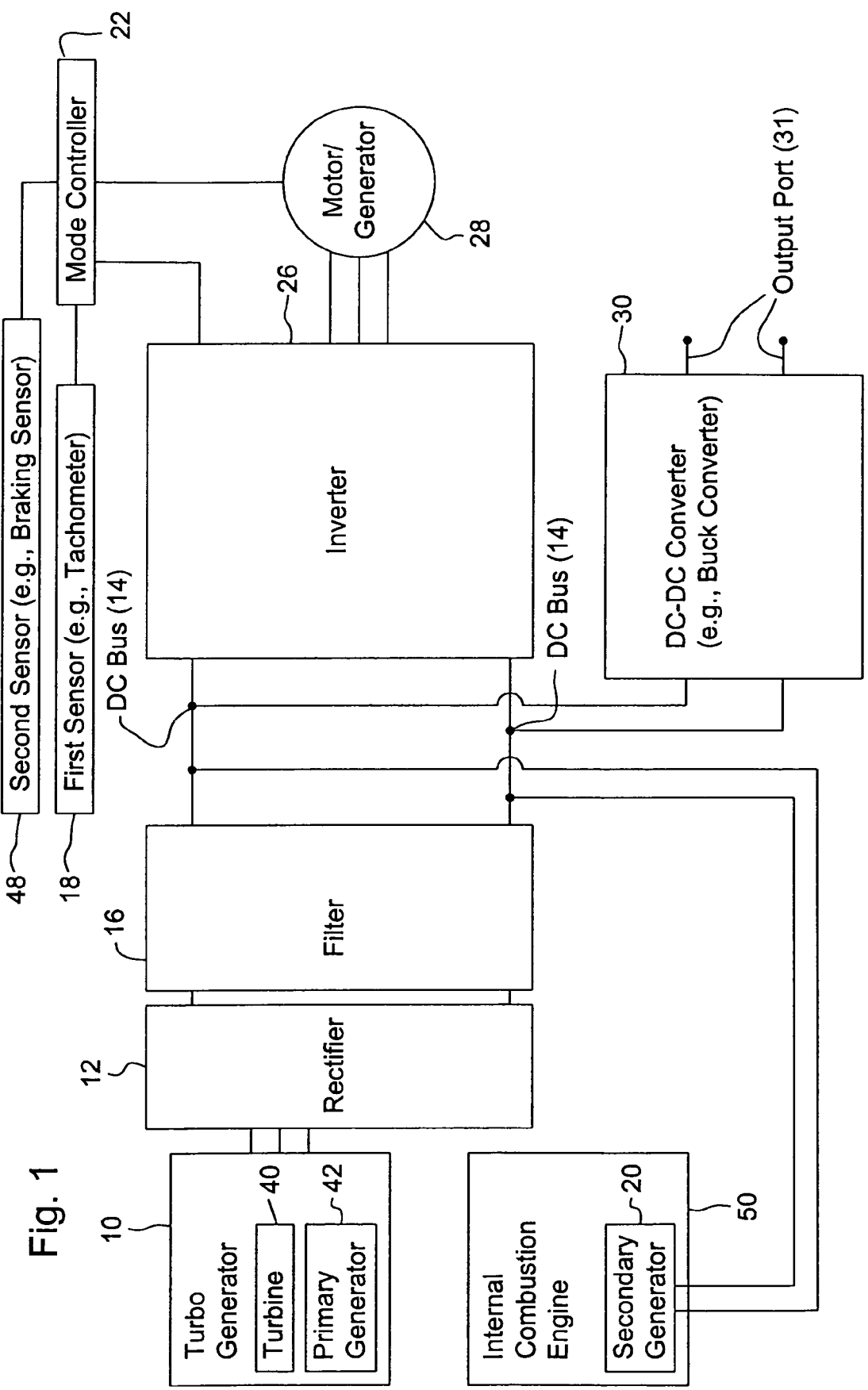
FIG. 1 is a block diagram of one embodiment of a system for managing an electrical output of a turbogenerator.
Figure 2:
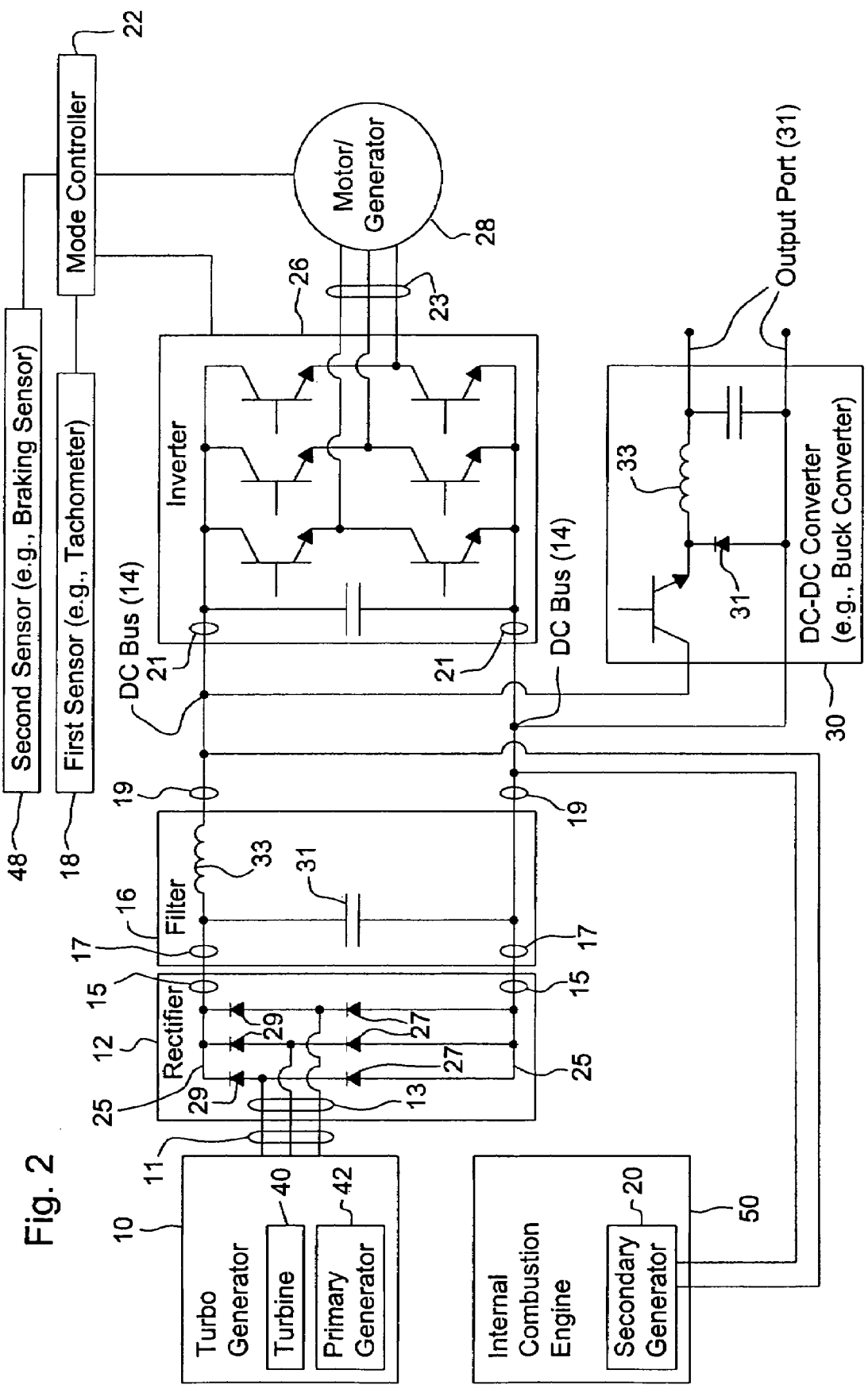
FIG. 2 shows illustrative schematic representations for corresponding blocks of FIG. 1.

In FIG. 1 and FIG. 2, a turbogenerator electrical output 11 of a turbogenerator 10 is coupled to a rectifier input 13 of a rectifier 12. A rectifier output 15 of the rectifier 12 is connected to a filter input 17 of a filter 16. The filter 16 filters the direct current signal for the direct current (DC) bus 14. A filter output 19 of the filter 16 is coupled to an inverter 26. The inverter 26 communicates a control signal (e.g., variable frequency or variable pulse width modulated signal) to a motor/generator 28. The motor/generator 28 comprises: (a) a motor or electric drive in a propulsion mode and (b) a generator or alternator during a power generation mode. In the propulsion mode, the motor is capable of rotating a motor output shaft, whereas in the power generation mode the generator converts mechanical rotational energy into electrical energy. It is understood by those of skill in the art that the terms "motor", "generator", or "alternator" could be used generally interchangeably with "motor/generator," without any loss of functionality, limitation of mode, or meaning with the caveat that "alternator" may appropriately refers to alternating current (AC) configurations.

A converter 30 (e.g., DC-DC converter or Buck converter) is coupled across the direct current bus 14, the filter output 19, or both to provide a direct current (DC) output port 31. The filter output 19 may feed electrical energy to an input of the converter 30. The converter 30 provides direct current (DC) at the output port 31 at a desired output level (e.g., higher or lower than the level of the DC bus 14). For example, the converter 30 regulates a second voltage level (or desired output level) associated with an output port 31 to differ from a first voltage level associated with the direct current bus 14.

A first sensor 18 (e.g., tachometer) is associated with a turbogenerator. The first sensor 18 measures the rotation per unit time, angular displacement per unit time, rotational velocity, rotational speed, or rotational acceleration of a shaft, rotor, turbine, turbine blade or other rotational member of a turbogenerator 10. In one configuration, the first sensor 18 may monitor a number of voltage pulses per unit time associated with the rectifier 12 or the back electromotive force (EMF) produced in the windings of the primary generator 42 to infer or estimate the rotational speed of the shaft, rotor, turbine, or turbine blades.

A second sensor 48 may comprise any sensor that detects braking or deceleration of the vehicle. For example, the second sensor 48 may comprise one or more accelerometers associated with the vehicle, a contact switch or an optical switch associated with the brake pedal of the vehicle, a piezoelectric device associated with the brake actuator or braking pads, a electro-hydraulic flow sensor, or another suitable sensor. The first sensor 18 and the second sensor 48 are coupled to a mode controller 22 to provide input data or input signals thereto.

The mode controller 22 controls the motor/generator 28. For example, the mode controller 22 may select a propulsion state or an energy generation state of the motor/generator 28 based on the input data or input signals from the sensors (18, 48). The mode controller 22 may comprise a comparator, a logic circuit, a logic unit, programmable digital signal processors, a microcontroller, or other data processor or a software module that determines whether the turbogenerator revolutions per unit time, or first sensor data or a signal representative thereof, exceed a minimum threshold or reference range. If the turbogenerator revolutions per unit time exceed the minimum threshold or range, the mode controller 22 may generate one or more control signals to control the states of switches in the switching circuit 24.

In an alternate embodiment, the mode controller 22 controls one or more states of a secondary generator 20. For example, the mode controller 22 may activate (or engage) an electromagnetic clutch to impart rotational energy directly or indirectly from a shaft (e.g., crankshaft) of the internal combustion engine 50 to the secondary generator 20 in the second mode, whereas the mode controller 22 may deactivate (or disengage) an electromagnetic clutch to remove rotational energy from the secondary generator 20 in the first mode.

In one embodiment, the turbogenerator 10 comprises a turbine (e.g., an exhaust-driven turbine) in communication with exhaust gas or steam associated with an internal combustion engine 50. The turbine is mechanically coupled to a primary generator 42 (e.g., alternator) that generates electrical energy that may be used by one or more components of the vehicle. Although the internal combustion engine 50 may be run at target or target range of revolutions per unit time (e.g., 1,800 to 2,200 revolutions per minute) of a shaft (e.g., crankshaft) for efficient operation, the internal combustion engine 50 may be run at virtually any revolutions per unit time within its operational range. A fuel delivery system (e.g., fuel injection system or carburetion system) may be associated with a controller (e.g., regulator) for metering or otherwise regulating the flow of fuel to maintain the target or target range of revolutions per unit time, for example.

The internal combustion engine 50 is capable of driving the secondary generator 20 (e.g., alternator) to generate electrical power. The secondary generator 20 may be associated with a clutch (e.g., an electromagnetic clutch), but is not necessarily associated with a clutch, for coupling and decoupling to mechanical or rotational energy provided by the engine 50.

The electrical output of the secondary generator 20 may be rectified within the secondary generator 20 or via a secondary rectifier coupled to an electrical output of the secondary generator 20. The rectified electrical output of the secondary generator 20 is coupled to the direct current bus 14. For example, the electrical output of the secondary generator 20 and the filter 16 are coupled in parallel to the DC bus 14. The rectifier 12 provides isolation to prevent the electrical current generated by the secondary generator 20 from flowing into the primary generator 42 (e.g., the windings of the primary generator 42).

In one embodiment, as best illustrated in FIG. 2, the rectifier 12 comprises pairs of diodes. Each pair comprises a first diode 27 coupled in series to a second diode 29. An anode of the first diode 27 is coupled to one rail of the unrectified DC bus 25, whereas a cathode of the second diode 29 is coupled to another rail of the unrectified DC bus 25.

In one embodiment, the filter 16 may comprise the combination of a capacitor 31 placed in parallel across the rectified DC bus 25, and an inductor 33 in series with one rail of the unrectified DC bus 25. The capacitor 31 may comprise an electrolytic capacitor or a similar capacitor to smooth voltage ripples (or electrical transients) that might otherwise appear on the DC bus 14. In one configuration, the frequency response of rectifier 12, the filter 16 or both is selected to reduce or attenuate unwanted harmonics in the generated electrical energy of the primary generator 42 by a minimum amount at the DC bus 14.

The inverter 26 may comprise one or more semiconductors arranged in a switch mode configuration. Here, the semiconductors are shown as NPN transistors (e.g., power switching transistors) for illustrative purposes. Although the schematic representation of the inverter 26 omits biasing networks and control circuitry for the NPN transistors and other components, such biasing networks and control circuitry for switch mode inverters are generally well known.

In general, the mode controller 22 may provide one or more of the following: (1) biasing networks and control circuitry (e.g., logic circuits) to operate the inverter 26 one or more distinct modes, (2) control data or control signal to operate the inverter in one or more distinct modes, (3) biasing networks and control circuitry (e.g., logic circuits) to operate the secondary generator 20 or an electromagnetic clutch associated therewith in one or more distinct states, and (4) control data or control signals to operate the secondary generator 20 or electromagnetic clutch associated therewith in one or more distinct states. In a first mode, the mode controller 22 controls the inverter 26 to support the acceptance of generated electrical energy from the primary generator 42, the secondary generator 20, or both. Further, the mode controller 22 controls the inverter 26 to support the flow of the generated electrical energy from the primary generator 42 to the DC bus 14 or the motor/generator 28. In the second mode, mode controller 22 supports the generation of electrical energy by the motor/generator 28 and its flow from the motor/generator 28 to the DC bus 14.

In the first mode, the inverter 26 may chop or process the DC signal on the DC bus 14 to output an alternating current (AC) output signal suitable for energizing the drive motor 28. In one example, the inverter 26 provides a variable frequency drive signal with one or more phases for the motor 28. In another example of the first mode, the inverter 26 supports the pulse-width modulation of the inputted DC signal at the inverter input 21 to produce a variable or controllable AC output signal for driving the motor/generator 28.

In the second mode, the mode controller 22 or inverter 26 may control the switches (e.g., NPN transistors) to regulate the voltage and current of electrical energy output by the motor/generator 28 and to provide rectification of any alternating current output to a direct current output.

In one example, the converter 30 (e.g., DC-DC converter) may comprise a Buck converter 30. In one embodiment, the converter 30 accepts a DC input voltage from the DC bus 14 and provides a different DC output voltage at the output port 31. For example, the output port 31 of the converter 30 provides a higher or lower voltage DC output. The output port 31 may be used to power auxiliary components, electronics, electric fans, electric motors, electric fuel pumps, electric pumps, or other electrical or electronic devices or vehicular accessories besides the drive motor 28. Further, the converter 30 may provide noise isolation or regulation of the DC voltage output at the output port 31.

Although the configuration of FIG. 2 illustrates the converter 30 as a step-down Buck converter 30 in which the DC voltage level from the DC bus 14 is generally decreased, any configuration of converter 30 may be used and falls within the scope of the invention. For example, interchanging the diode 31 and inductor 33 in the circuit of FIG. 2 results in a step-up Buck converter 30 or boosting Buck converters that may be used for DC-DC converter 30 in which the DC voltage level from the DC bus 14 is generally increased at the output port 31 and higher than that of the DC bus 14. Other types of DC converters for DC-DC converter 30 include inverting, push-pull, half-bridge and full bridge, among other possibilities. Some DC converters may support bi-directional current flow with voltage regulated output for output port 31, such that an energy storage device (e.g., battery of a desired voltage level or range) could be coupled across the output port 31 to provide reserve electrical energy for the motor/generator 28.

The system of FIG. 1 and FIG. 2 may operate any of several distinct power generation modes, which may be applied alternately are cumulatively. Under a first mode, a turbine 40 of the turbogenerator 10 provides electrical power from the turbine's conversion of exhaust gas into mechanical energy. The primary generator 42 converts the mechanical energy into electrical energy, which the switching circuit 24 may make available to the drive motor 28, the converter 30, or both. The first mode is active when the turbogenerator revolutions per unit time (e.g., RPM) is above or equal to a minimum threshold.

In an alternate embodiment, the first mode may include the secondary generator 20 providing electrical energy to the DC bus 14 in parallel with the turbogenerator output the primary generator 42. For example, the mode controller 22 may control (e.g., activate or deactivate) an electromagnetic clutch associated with the secondary generator 20 to selectively apply or withdraw rotational energy to the secondary generator 20 from the internal combustion engine 50 in accordance with load requirements or demand on the DC bus 14.

Under a second mode, the internal combustion engine 50 mechanically drives a secondary generator 20 to convert mechanical energy into electrical energy. The second mode is generally active when the turbogenerator revolutions per unit time (e.g., RPM) are below the minimum threshold.

In a third mode or regenerative braking mode, the motor/generator 28 acts as a tertiary generator for the vehicle. In the third mode, the motor/generator 28 or tertiary generator may be coupled to the inverter 26 to facilitate rectification of an alternating current signal provided by the motor 28 or tertiary generator, regulation of the generated electrical current, and voltage, or both rectification and regulation. The third mode is active when the vehicle is braking or when the vehicle is decelerating in accordance with an operator's input or otherwise.

The system for managing electrical output of a turbogenerator may support the simultaneous operation of multiple modes, among the first mode, the second mode and the third mode. To support operation in multiple modes, the rectifier 12 and inverter 26 facilitate parallel interconnections of two or more outputs associated with the primary generator 42, the secondary generator 20, and the tertiary generator (i.e., the motor 28). In an alternate embodiment, one or more diode networks may be used at the DC bus 14 for coupling and isolating the output signals of the generators (42, 20, and 28) in parallel. Each diode network may comprise at least one diode, or multiple diodes in parallel, for a corresponding terminal of the DC voltage bus at a corresponding generator output. For example, a first diode network is placed in series with a DC terminal output (e.g., positive terminal) of the primary generator 42, a second network is placed in series with the DC terminal output (e.g., a positive terminal) of the secondary generator 20, and the third diode network is coupled in series with the DC terminal output (e.g., positive terminal) of the tertiary generator, and the appropriate terminals (e.g., cathode terminals where the above DC terminal is positive and anode where the DC terminal polarity is negative) of the diode networks are coupled together at a common connection node that feeds the common DC terminal (e.g., positive terminal) of the DC bus 14. The diode networks facilitate simultaneous application of or power generation in at least two of the first mode, the second mode, and the third mode. Further, such diode networks may support redundancy or a controlled failure mode, where the rectifier 12 is disabled or fails.

Figure 3:
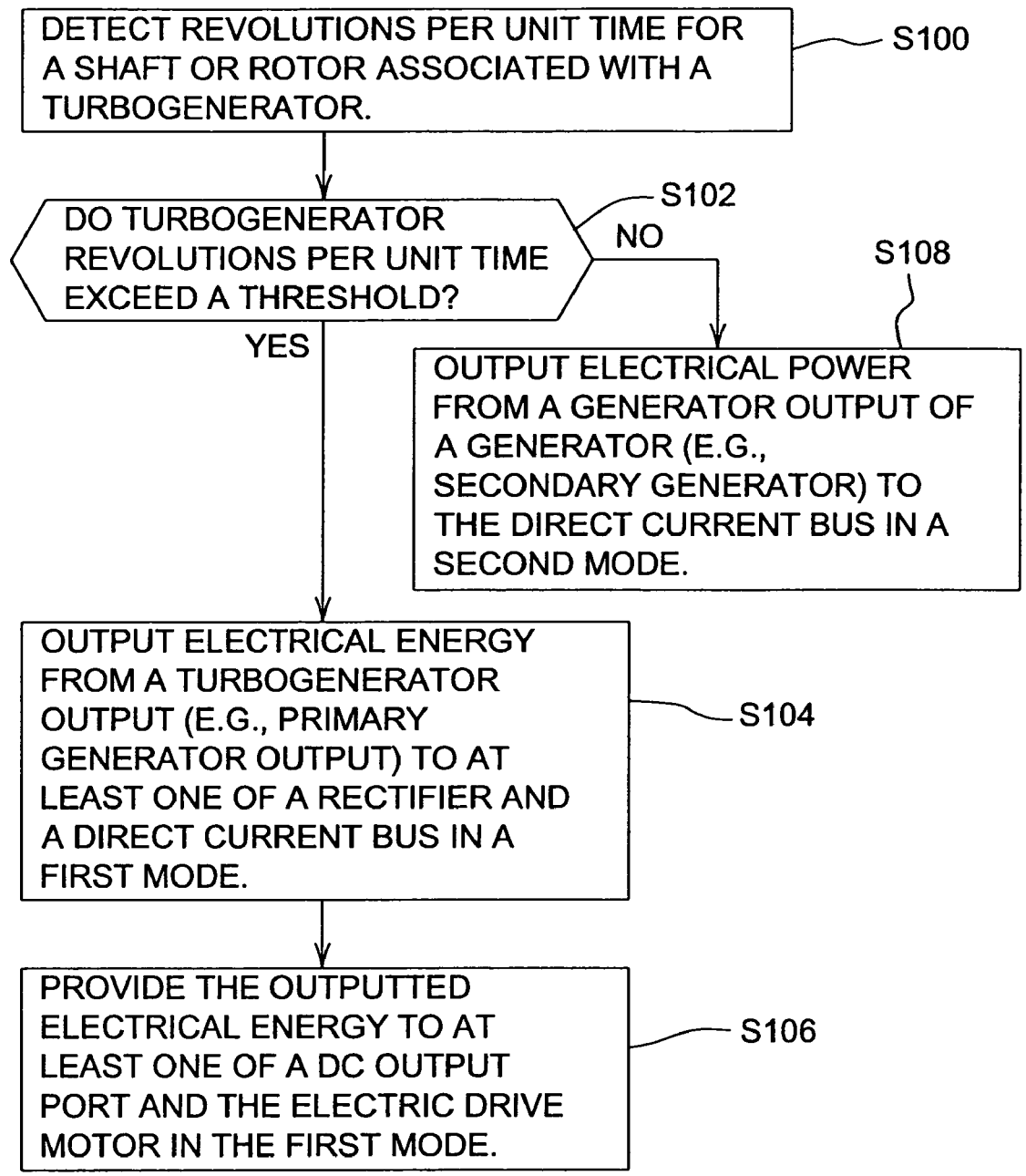
FIG. 3 is a flow chart of one embodiment of a method for managing an electrical output of a turbogenerator.

FIG. 3 is a method for managing electrical output of a turbogenerator 10 in accordance with multiple modes. The system of FIG. 1 and FIG. 2 may be applied to carry out the method of FIG. 3. The method of FIG. 3 begins in step S100.

In step S100, a first sensor 18 detects revolutions per unit time (e.g., revolutions per minute (RPM)) for a turbogenerator 10. The first sensor 18 may comprise a tachometer or another sensor for measuring turbogenerator revolutions per unit time of a shaft, rotor, turbine, or other rotation member associated with the turbogenerator 10. For example, the shaft, rotor, or other rotational member of the primary generator 42 may be associated with a magnet (or electromagnet) for rotation therewith. Alternately, a shaft, rotor, turbine blades or other rotational member of the turbine 40 may be associated with a magnet for rotation therewith. A stationary sensing coil coupled to a detection circuit may measure or count current fluctuations (or voltage fluctuations) per unit time imparted into coil to estimate the revolutions per unit time of the shaft, rotor, turbine blades, or other rotational member.

In step S102, the mode controller 22 determines if turbogenerator revolutions per unit time meet or exceed a minimum threshold. The user may establish the minimum threshold that is proportional to or based on the electrical energy (e.g., current level, voltage level, or both) generated by the turbogenerator 10 at or above the minimum threshold, for example. The electrical energy generated by the turbogenerator 10 below the threshold may be insufficient to produce a reliable direct current (DC) waveform at the DC bus 14 that is capable of driving the motor 28 via the inverter 26. If the turbogenerator revolutions per unit time meet or exceed the minimum threshold, the method continues with step S104. However, if the turbogenerator revolutions per unit time do not exceed the minimum threshold, the method continues with step S108.

In step S104, the turbogenerator 10 supplies or outputs electrical energy to at least one of a rectifier 12 and a direct current (DC) bus 14 in a first mode. For example, the rectifier 12 rectifies the outputted electrical energy from the turbogenerator output prior 11 to applying it to the direct current bus 14 in the first mode. The mode controller 22 controls the inverter 26 to accept output electrical energy from a turbogenerator output 11 (e.g., primary generator output) in a first mode.

In one illustrative example, step S104 may be carried out as follows. The turbine 40 imparts mechanical rotation of the primary generator 42 to produce alternating current (AC) electrical energy, which is rectified by the rectifier 12. The rectifier output 15 and the filter input 17 are associated with the unfiltered or unrectified DC bus. The filter 16 filters the rectified signal for the filter output 19. The filter output 19 may provide the generated electrical energy to the DC bus 14.

In step S106, following step S104, or simultaneously therewith, the mode controller 22 controls the inverter 26 to accept to output electrical energy from the primary generator 42 for the electric drive motor 28 in the first mode. In turn, the converter 30 provides a DC output voltage at the DC output port 31.

In step S108, the secondary generator 20 supplies or outputs a generator output to the direct current bus 14 in a second mode. Further, the mode controller 22 controls the inverter 26 to accept output electrical power from a generator output of the secondary generator 20 to the direct current bus 14 in the second mode. Step S108 may be carried out in accordance with several techniques that may be applied cumulatively or separately.

Figure 4:
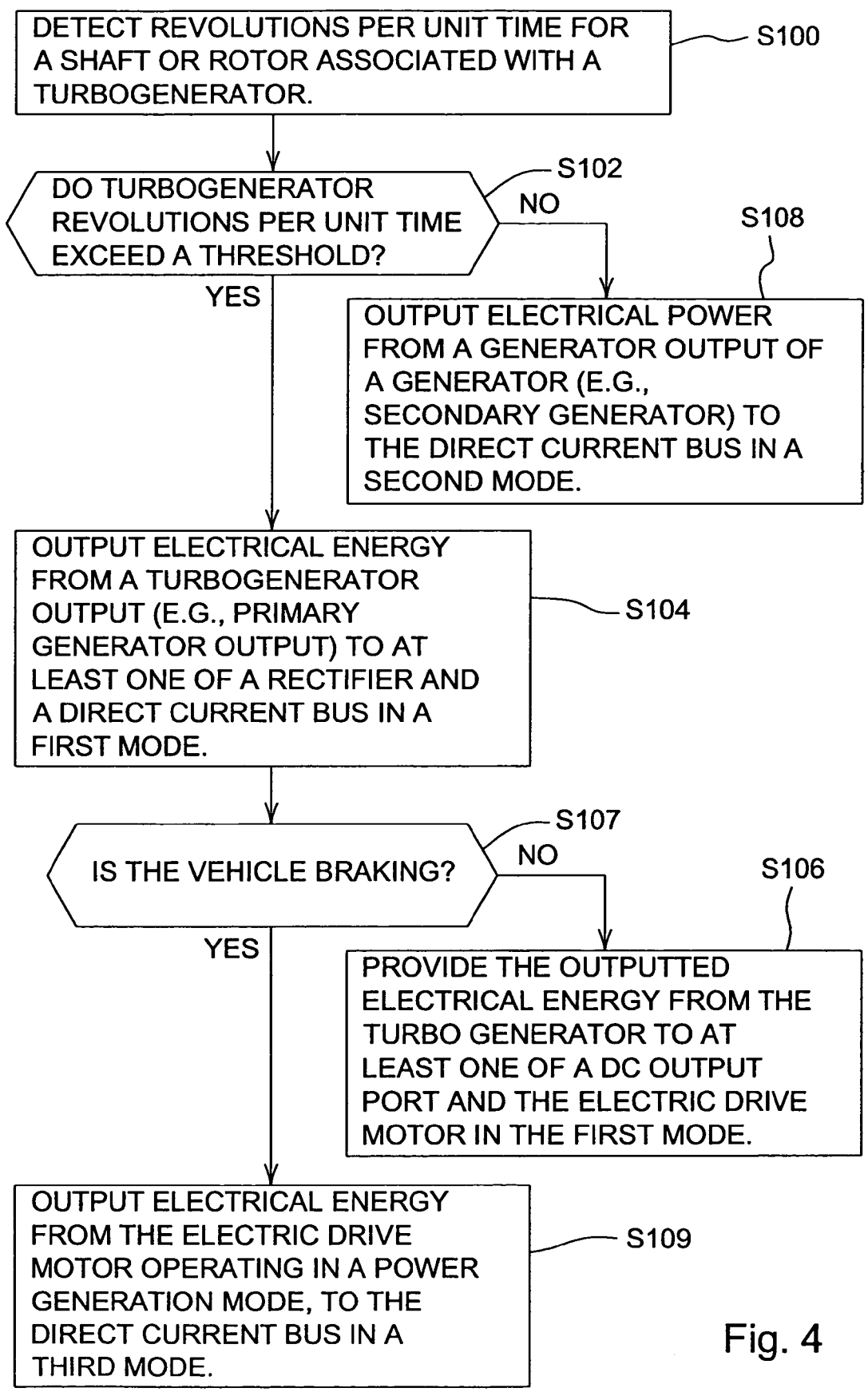
FIG. 4 is a flow chart of another embodiment of a method for managing an electrical output of a turbogenerator.

The method of FIG. 4 is similar to the method of FIG. 3, except steps S107 and S109 are added. Like reference numbers in FIG. 3 and FIG. 4 indicate like steps or procedures. Step S107 may be executed after step S106, for example.

In step S107, a mode controller 22 or second sensor 48 determines whether a vehicle is braking or whether an operator is applying the brakes of the braking system. The braking system may comprise a hydraulic braking system, an electrical braking system, a mechanical braking system, a friction braking system, a magnetic or electromagnetic braking system, or the like. If the vehicle is braking or if an operator is applying the brakes, the method continues with step S109. However, if the vehicle is not braking, the method continues with step S104.

In step S109, the electric drive motor/generator 28 (which is also referred to as the tertiary generator when operating in a power generation mode) outputs electrical energy to the direct current bus 14 (e.g., via the inverter 26), while operating in a power generation mode or regenerative braking mode. The drive motor/generator 28 may complement or supersede the braking function of the other braking system of the vehicle, during step S109. In accordance with one example of carrying out step S109, the mode controller 22 may control the inverter 26 to act as a supplemental rectifier and a regulator of electrical output generated by the motor/generator 28.

Accordingly, in step S109 the drive motor 28 is used in a power generation mode as a tertiary power generator by opposing the motion or momentum of the vehicle, either alone or in combination with the braking system of the vehicle. In step S109, the mode controller 22 may determine that the drive motor/generator 28 is generally not used as a tertiary power generator if the vehicle is not moving or if the operator needs to increase the speed or acceleration of the vehicle, or if the internal combustion engine does not indirectly or directly drive at least one wheel of the vehicle, for example.

In step S106, the turbogenerator 10 or primary generator 42 provides the outputted electrical energy to at least one of a DC output port and the electric drive motor in the first mode. Step S106 is described in greater detail in conjunction with FIG. 3.

Figure 5:
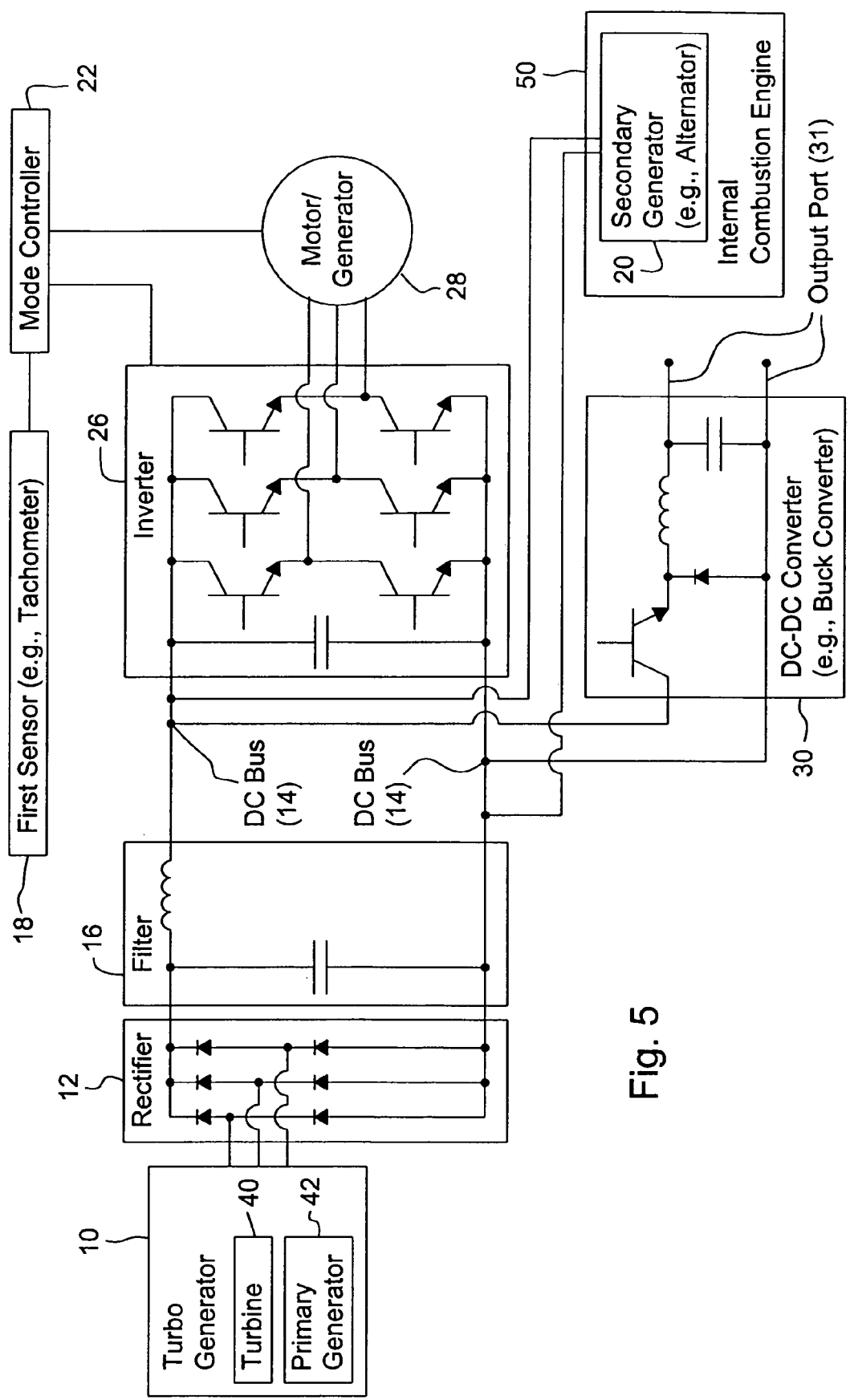
FIG. 5 is a block diagram of another embodiment of a system for managing an electrical output of a turbogenerator.

The system of FIG. 5 is similar to the system of FIG. 1, except the system of FIG. 5 deletes the second sensor 48. Like reference numbers in FIG. 1, FIG. 2, and FIG. 5 indicate like elements.

Figure 6:
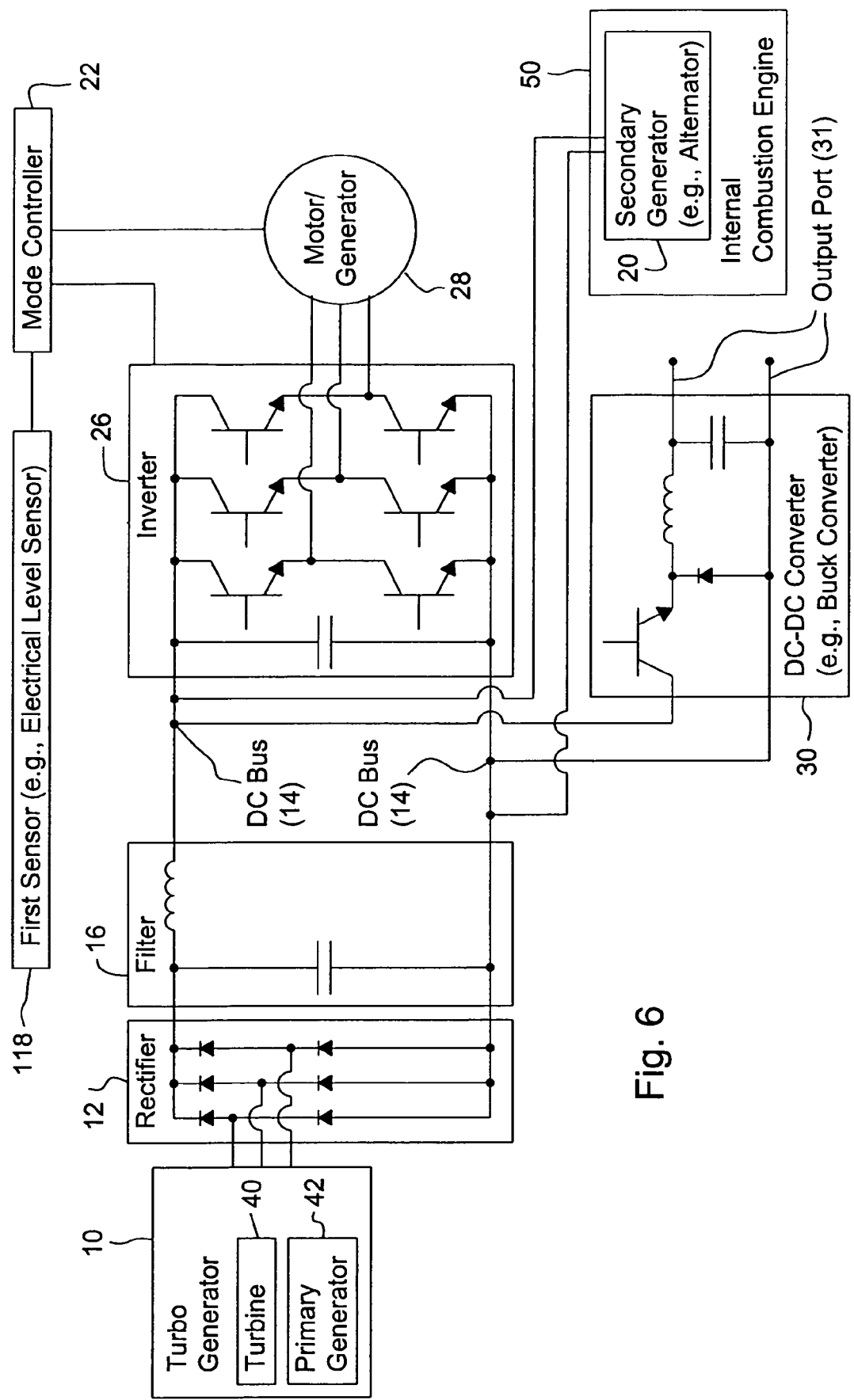
FIG. 6 is a block diagram of yet another embodiment of a system for managing an electrical output of a turbogenerator.

The system of FIG. 6 is similar to the system of FIG. 1, except the system of FIG. 6 replaces first sensor 18 with first sensor 118 and deletes the second sensor 48. Like reference numbers in FIG. 1, FIG. 2, and FIG. 4 indicate like elements.

The first sensor 118 comprises an electrical level sensor. For example, the electrical level sensor may comprise a voltage meter, a current meter, a comparator, a resistive bridge, or another circuit for measuring changes in current or voltage or signal quality generated by the primary generator 42 of the turbogenerator 10. Rather than measuring the turbogenerator revolutions per unit time, the first sensor 118 measures changes in current, voltage or signal quality to facilitate determination of the proper mode by the mode controller 22. For example, if the electrical output current level or voltage level (e.g., current level or voltage level) of the primary generator 42 falls above or equals a minimum threshold, the mode controller 22 may instruct the switching circuit 124 to operate in a first mode. However, if the current level or voltage level is less than a minimum threshold, the mode controller 22 may instruct the switching circuit 124 to operate in a second mode.

Figure 7:
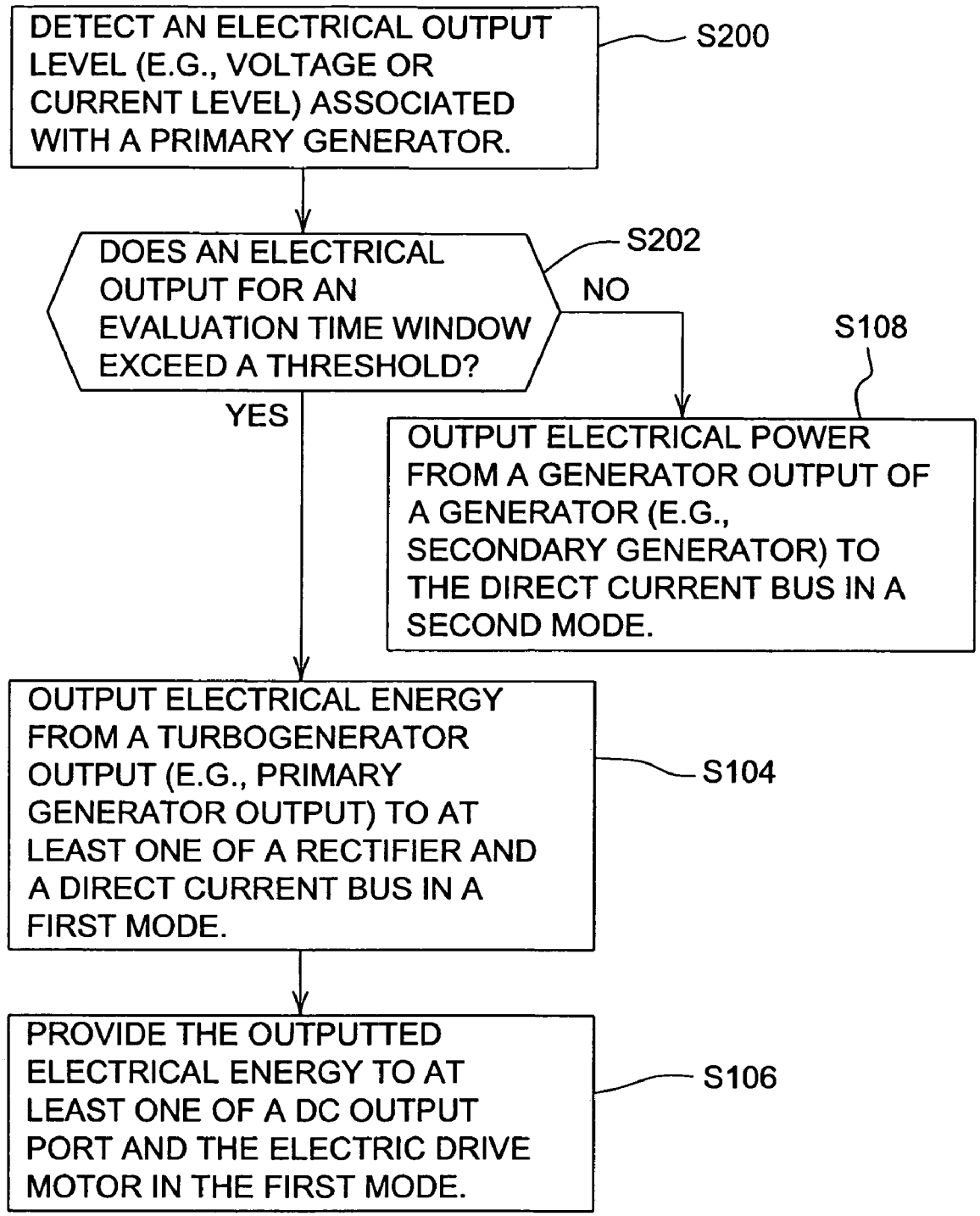
FIG. 7 is a flow chart of another embodiment of a method for managing an electrical output of a turbogenerator.

The method of FIG. 7 is similar to the method of FIG. 3, except FIG. 7 replaces step S100 and S102, with steps S200 and S202, respectively. Like reference numbers in FIG. 7 and FIG. 3 indicate like steps or procedures.

In step S200, a first sensor 118 detects an electrical output level (e.g., current level, voltage level) outputted by the turbogenerator 10 or the primary generator 42 during an evaluation time window. As previously indicated, the speed sensor 118 may comprise a volt meter, a voltage level detector, a comparator, a current meter, a current detector, or another sensor for measuring an electrical output of the primary generator 42.

In step S202, the mode controller 22 determines if the detected electrical level exceeds a minimum threshold. The user may establish the minimum threshold with reference to the electrical energy (e.g., current level, voltage level, or both) generated by the turbogenerator 10 under various load conditions, for example. The electrical energy generated by the turbogenerator 10 below the threshold may be insufficient to produce a reliable direct current (DC) waveform at the DC bus 14 that is capable of driving the motor 28 via the inverter 26. If the detected electrical level exceeds a minimum threshold, the method continues with step S104. However, if the detected electrical level does not exceed the minimum threshold, the method continues with step S108. Steps S104 and S108 were previously described in conjunction with FIG. 3, and apply equally to FIG. 7.

Having described the preferred embodiment, it will become apparent that various modifications can be made without departing from the scope of the invention as defined in the accompanying claims.

The following is claimed:

1. A method for managing an electrical output of a turbogenerator having a turbine in communication with exhaust associated with an internal combustion engine, the method comprising:
   detecting revolutions per unit time associated with the turbogenerator;
   outputting electrical energy from a turbogenerator output through a rectifier to a direct current bus in a first mode where the detected turbogenerator revolutions per unit time meet or exceed a minimum threshold;
   providing the outputted electrical energy from the direct current bus to at least one of an electric drive motor through an inverter and a direct current port in the first mode; and
   outputting electrical power from a generator output of a secondary generator, distinct from the turbogenerator and mechanically driven by the internal combustion engine, to the direct current bus in a second mode where turbogenerator revolutions per unit time are less than the minimum threshold.

2. The method according to claim 1 wherein the providing further comprises inverting the outputted electrical energy for application to the electric drive motor.

3. The method according to claim 1 further comprising:
   regulating a second voltage level associated with an output port of the direct current port to differ from a first voltage level associated with the direct current bus.

4. The method according to claim 1 further comprising:
   sensing whether or not a vehicle is braking; and
   using the electric drive motor to generate electrical energy during the braking of the vehicle in a third mode.

5. The method according to claim 4 further comprising:
   supporting simultaneous application of at least two of the first mode, the second mode and the third mode via a diode network.

6. A system for managing an electrical output of a turbogenerator having a turbine in communication with exhaust associated with an internal combustion engine, the system comprising:
   a first sensor for detecting revolutions per unit time associated with a shaft or a rotor of the turbogenerator;
   a direct current bus;
   the turbogenerator for outputting electrical energy from a turbogenerator output to feed the direct current bus through a rectifier in a first mode where the detected turbogenerator revolutions per unit time meet or exceed a minimum threshold;

an electric drive motor for accepting the outputted electrical energy in the first mode from the direct current bus through an inverter; and
a secondary generator, distinct from the turbogenerator and mechanically driven by the internal combustion engine, for outputting electrical power from a generator output to the direct current bus in a second mode where the detected turbogenerator revolutions per unit time are less than the minimum threshold.

7. The system according to claim 6 wherein the rectifier rectifies the outputted electrical energy from the turbogenerator output prior to applying it to the direct current bus in the first mode.

8. The system according to claim 6 wherein the
inverter inverts the received electrical energy prior to applying it to the electric drive motor, where the electrical drive motor is associated with the direct current bus.

9. The system according to claim 8 further comprising:
a switching system for forming an interconnection between the turbogenerator output and an inverter input of the inverter in the first mode.

10. The system according to claim 6 further comprising:
a converter for regulating a first voltage level associated with the direct current bus to a second voltage level associated with an output port.

11. The system according to claim 10 further comprising:
a switching system for forming an interconnection between the turbogenerator output and a converter input of the converter in the first mode.

12. The system according to claim 6 further comprising:
a second sensor for determining whether or not the vehicle is braking;
a mode controller facilitating a third mode in response to vehicle braking in which the electric drive motor output is rectified for generating electrical energy for the direct current bus.

13. The system according to claim 12 further comprising:
a diode network to facilitate simultaneous application of at least two of the first mode, the second mode and the third mode.

14. A method for managing an electrical output of a turbogenerator having a turbine, in communication with exhaust associated with an internal combustion engine, and mechanically couple to a primary generator, the method comprising:
detecting an electrical output level associated with the primary generator of the turbogenerator;
outputting electrical energy from a turbogenerator output through a rectifier to a direct current bus in a first mode where the detected electrical output level meets or exceeds a minimum threshold; and
providing the outputted electrical energy from the direct current bus to at least one of an electric drive motor through an inverter and a direct current port in the first mode.

15. The method according to claim 14 further comprising:
outputting electrical power from a generator output of a secondary generator, distinct from the turbogenerator and mechanically driven by the internal combustion engine, to the direct current bus in a second mode where the electrical output level time is less than the minimum threshold.

16. The method according to claim 14 further comprising:
sensing whether or not a vehicle is braking; and
using the electric drive motor to generate electrical energy during the braking of the vehicle in a third mode.

17. A system for managing an electrical output of a turbogenerator having a turbine in communication with exhaust associated with an internal combustion engine, the system comprising:
a first sensor for detecting an electrical output level associated with the turbogenerator;
a direct current bus;
the turbogenerator for outputting electrical energy from a turbogenerator output to feed the direct current bus in a first mode where the detected electrical output level during an evaluation time window meets or exceeds a minimum threshold;
an electric drive motor for accepting the outputted electrical energy in the first mode; and
a secondary generator, distinct from the turbogenerator and mechanically driven by the internal combustion engine, for outputting electrical power from a generator output to the direct current bus in a second mode where the detected electrical output level is less than the minimum threshold.

18. The system according to claim 17 further comprising:
a rectifier;
a second sensor for determining whether or not the vehicle is braking;
a mode controller facilitating a third mode in response to vehicle braking in which the electric drive motor is coupled to the rectifier for generating electrical energy for the direct current bus.

19. A system comprising:
an internal combustion engine;
a turbogenerator having a turbine in communication with exhaust associated with the internal combustion engine wherein the turbine is mechanically coupled to a primary generator or alternator for generating electrical energy output;
a secondary generator or alternator mechanically driven by the internal combustion engine;
a sensor for inferring a rotational speed of a rotational member of the turbogenerator;
a mode controller coupled to the sensor;
a direct current bus for receiving power i) from the turbogenerator output in a first mode controlled by the mode controller if the sensor senses a condition above a threshold, and ii) in a second mode controlled by the mode controller if the sensor senses a condition below the threshold from at least one of a) the secondary generator, and b) an electric drive motor/generator.

20. The system of claim 19 wherein the sensor infers a rotational speed from at least one of i) determining a rotation per unit time of a rotational member of the turbogenerator, ii) determining a number of voltage pulses per unit time of a rectifier between the turbogenerator output and the direct current bus, iii) determining a back electromotive force (EMF) produced in windings of the primary generator.

21. The system of claim 19 further comprising a converter providing direct current, at a direct current output port from the direct current bus, at a desired output level different from a first voltage level associated with the direct current bus.

22. The system of claim 21 wherein the direct current output port powers electrical devices associated with a vehicle distinct from the electric drive motor/generator utilized for propulsion.

23. The system of claim 19 further comprising a second sensor, coupled to the mode controller, for detecting braking or deceleration of a vehicle.

24. The system of claim 23 wherein the mode controller controls the electric drive motor/generator by selecting a propulsion state or an energy generation state based on input signals from the sensors.

25. The system of claim 19 wherein the mode controller controls the secondary generator by imparting rotational energy from the internal combustion engine to the secondary generator in the second mode and withdrawing the rotational energy to the secondary generator in the first mode.

26. The system of claim 19 wherein electrical output of the secondary generator is rectified, the rectified electrical output of the secondary generator is coupled to the direct current bus, and the rectified electrical output is isolated from flowing into the primary generator.

27. The system of claim 19 further comprising an inverter for communicating a control signal from the direct current bus to the electric drive motor/generator having an electric drive for a propulsion mode and a generator or alternator for a power generation mode.

28. The system of claim 27 wherein the mode controller in the first mode controls the inverter to i) support acceptance of generated electrical energy through the direct current bus from at least one of the primary generator and the secondary generator, and ii) support a flow of generated electrical energy from the primary generator through the direct current bus to the electric drive motor/generator; and in the second mode to support a flow of generated electrical energy from at least one of the electric motor/generator and the secondary generator to the direct current bus.

29. The system of claim 19 further comprising:
the electric drive motor/generator having an electric drive for a propulsion mode and a generator or alternator for a power generation mode;
a converter providing direct current, at a direct current output port from the direct current bus, at a desired output level different from a first voltage level associated with the direct current bus; and
a switching circuit for making electrical energy from the turbogenerator available to the electric drive motor/generator and the converter separately or concurrently during the first mode.

30. The system of claim 19 wherein the mode controller selectively imparts or withdraws rotational energy to the secondary generator from the internal combustion engine in accordance with load requirements or demand on the direct current bus in a first mode for providing electrical energy from the secondary generator to the direct current bus in parallel with the turbogenerator output to the direct current bus.

31. The system of claim 19 wherein the condition below the threshold is insufficient to produce a reliable direct current waveform at the direct current bus that is capable of driving the electric drive motor/generator through an inverter.

* * * * *